United States Patent Office 2,767,194
Patented Oct. 16, 1956

2,767,194

COMPOSITIONS OF MATTER

Llewellyn W. Fancher, Concord, Calif., assignor to Stauffer Chemical Company, a corporation of Delaware No Drawing. Application March 18, 1955,
Serial No. 495,360

12 Claims. (Cl. 260—326)

This invention relates to certain novel compositions of matter and the method of making the same.

The invention particularly relates to phthalimidomethyl monothio- and dithio-phosphates having the following structural formula:

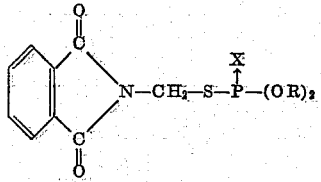

In the above formula, X is oxygen or sulfur and R is a lower alkyl group such as an isopropyl, propyl, methyl, ethyl, butyl or pentyl radical.

In general, the objects of the present invention are accomplished by reacting an N-halomethyl-phthalimide with the appropriate salt such as an alkali metal or ammonium salt of a dialkyl dithio- or monothio-phosphate by refluxing them together with an inert solvent such as methanol, ethanol or isopropanol. The product can then be recovered by first evaporating the bulk of the alcohol and then extracting the desired product with a suitable solvent. The products that are solids can be further purified by crystallization from alcohol.

The following non-limiting examples illustrate methods of carrying out the present invention. It will be noted that code numbers have been assigned to the various compositions and these code numbers will be used in the balance of the specification when referring to the compounds.

*Example 1.—R-1402 - S - phthalimidomethyl-O,O-diisopropyl dithiophosphate*

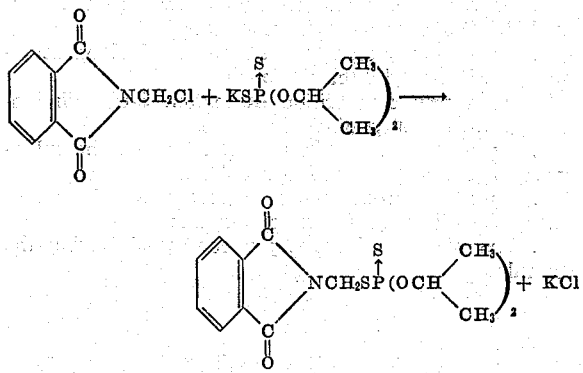

A mixture of 10.4 grams (0.053 M) of N-chloromethyl-phthalimide, 13.5 grams (0.054 M) of potassium-O,O-diisopropyl dithiophosphate and 75 cc. 99% isopropanol was refluxed on a steam-bath for four hours. The bulk of the alcohol was then evaporated and the residue was poured with rapid stirring into 150 cc. of cold water. The crude product separated as a white oily liquid which solidified on stirring. The solid was filtered off and washed several times with cold water and dried in air. The yield of crude product M. P. 92–97° was 19.9 grams. After crystallization from methanol, the product melted at 114–115.5° C.

| Analysis | Calculated | Found |
|---|---|---|
| Percent P | 8.31 | 8.32 |

*Example 2.—R-1448 - S - phthalimidomethyl-O,O-diethyl dithiophosphate*

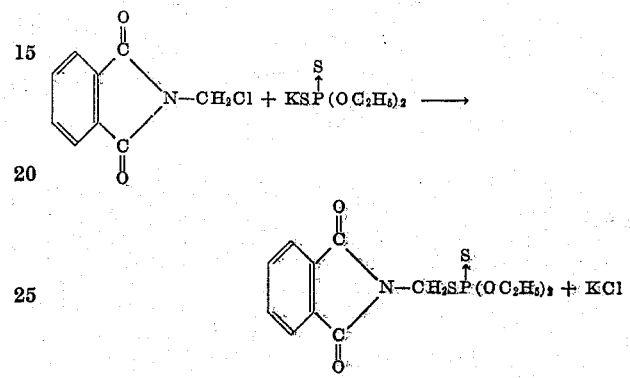

A mixture of 19.6 grams (0.1 M) of N-chloromethyl-phthalimide, 24.4 (0.11 M) of potassium O,O-diethyl dithiophosphate and 100 cc. of 99% isopropanol was refluxed on a steam-bath for four and one-half hours. The bulk of the alcohol was then evaporated and the warm residue poured with rapid stirring into 200 cc. of cold water. The precipitated liquid was extracted with 100 cc. of ethyl ether and washed twice with 100 cc. portions of cold water. The ether solution was dried over anhydrous potassium carbonate and filtered. The filtrate was concentrated on the steam-bath to a thick liquid, $N_D^{26}=1.5793$, which solidified on standing. The yield was 28.0 grams. After two crystallizations from 95% isopropanol the product melted at 63–65° C.

| Analysis | Calculated | Found |
|---|---|---|
| Percent P | 8.98 | 8.92 |

*Example 3.—R-1504-S-phthalimidomethyl-O,O-dimethyl dithiophosphate*

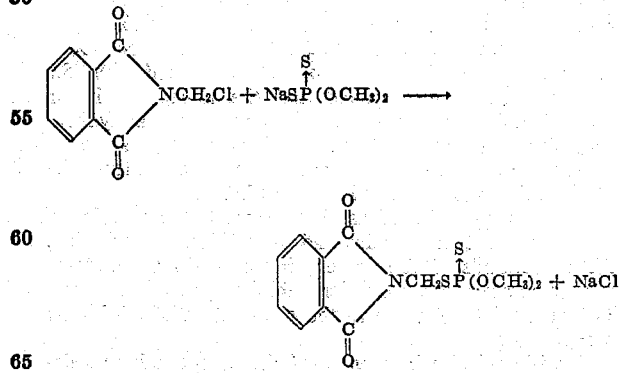

11.8 grams (0.06 M) of N-chloromethyl-phthalimide, 12.6 grams (0.07 M) of sodium O,O-dimethyl dithiophosphate, and 50 cc. of methanol were mixed and refluxed on a steam-bath for three and one-half hours. The reaction mixture was cooled and shaken with 100 cc. of benzene, then filtered. The filtrate was transferred to a separatory funnel and washed three times with water. After drying over anhydrous potassium carbonate, the dry benzene solution was filtered, then evaporated on the steam-bath. The product, a yellow liquid, weighed 10.2 grams, $N_D^{28}=1.5959$.

*Example 4.—R-1505 - S - phthalimidomethyl O,O-diethyl monothiophosphate*

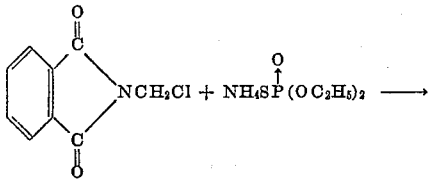

A mixture of 11.8 grams (0.06 M) of N-chloromethyl-phthalimide, 13.0 grams (0.07 M) of ammonium O,O-diethyl monothiophosphate and 35.0 cc. of absolute ethanol was heated under reflux on a steam-bath for three and one-half hours. The reaction mixture was cooled, diluted with 100 cc. of benzene, well mixed, then filtered. The filtrate was washed three times with water, dried over anhydrous potassium carbonate, filtered and the filtrate evaporated on the steam-bath. The product, a light yellow liquid, weighed 12.5 grams, $N_D^{27}=1.5412$.

*Example 5.—R-1571-S-phthalimidomethyl O,O-dimethyl monothiophosphate*

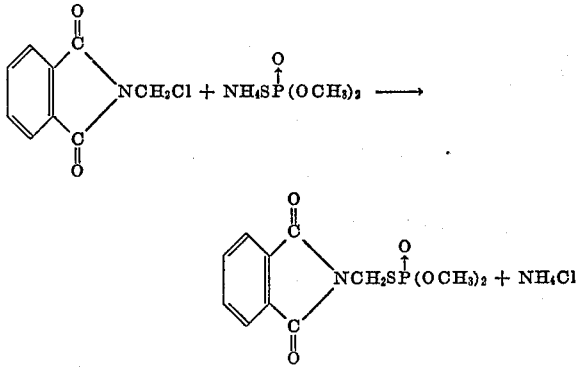

A mixture of 11.8 grams (0.06 M) of N-chloromethyl-phthalimide, 9.6 grams (0.06 M) of ammonium O,O-dimethyl monothiophosphate and 50.0 cc. of 99% isopropanol was refluxed on the steam-bath for three hours. After cooling, the reaction mixture was diluted with 75.0 cc. of benzene, well mixed and the benzene solution washed three times with water, dried over anhydrous potassium carbonate, filtered and the benzene evaporated on the steam-bath. The product was a water-white liquid weighing 8.8 grams $N_D^{27}=1.5651$.

Compounds prepared as above were tested and found to be excellent insecticides and acaracides. In addition, the compounds of the present invention have utility as rubber accelerators, corrosion inhibitors, plasticizers and as intermediates for use in the preparation of additional compounds.

The biological effectiveness of the compounds was determined by testing them as follows:

SCREENING TEST

Acetone solutions of the compounds are dispersed in water that has 0.015% Vatsol OT wetting agent and 0.005% Methocel (25 cps.) dissolved in it. The amount of water in the dispersion is adjusted so that the compound under test is in the desired concentration. The dispersion is sprayed on the test arthropods with a De Vilbiss hand sprayer. The arthropods are held in the sprayed cages for 72 hours. Mortality counts are made at 72 hours and the results reported as percentage of arthropods killed.

RESIDUE TEST

Compounds are deposited on 60 x 15 mm. petri dishes from acetone solutions. Adult female flies are exposed to the deposits in open and closed type cages for 48 hours. Mortality counts are made at 48 hours.

The following results were obtained:

SPRAY TEST

| | Percent Conc. | Percent Mortality | | | | |
|---|---|---|---|---|---|---|
| | | R1402 | R1448 | R1504 | R1505 | R1571 |
| *Musca domestica* | 0.5 | 100 | 100 | 100 | 100 | 100 |
| *Periplaneta americana* | 0.5 | 50 | 100 | 80 | 100 | 70 |
| *Oncopeltus fasciatus* | 0.5 | 0 | 80 | 80 | 70 | 100 |
| *Tribolium confusum* | 0.5 | 0 | 100 | 100 | 42 | 100 |
| *Aphis Fabae* | 0.25 | 87 | 100 | 100 | 100 | 100 |
| | 0.06 | | | | | 37 |
| *Tetranychus bimaculatus* | 0.25 | [1] 100 | [1] 100 | | | |
| | 0.03 | [1] 100 | [1] 100 | 100 | 100 | |

[1] Gave 100% kill of eggs as well as insects.

RESIDUE TEST—*Musca domestica*

| Micrograms per dish | Percent Mortality | | | | |
|---|---|---|---|---|---|
| | R1403 | R1448 | R1504 | R1505 | R1571 |
| 500 | 44 | | | | 100 |
| 250 | | | | | 92 |
| 100 | 24 | | 100 | 60 | 84 |
| 50 | | | 100 | 48 | |
| 25 | | 100 | 84 | 36 | |

I claim:
1. As a new composition of matter, a compound of the formula:

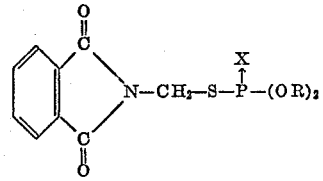

wherein X is a member chosen from the group consisting of oxygen and sulfur and R is a lower alkyl radical.

2. As a new composition of matter, S-phthalimidomethyl O,O-diisopropyl dithiophosphate.

3. As a new composition of matter, S-phthalimidomethyl O,O-diethyl dithiophosphate.

4. As a new composition of matter, S-phthalimidomethyl O,O-dimethyl dithiophosphate.

5. As a new composition of matter S-phthalimidomethyl O,O-diethyl monothiophosphate.

6. As a new composition of matter S-phthalimidomethyl O,O-dimethyl monothiophosphate.

7. The method of making a compound having the formula:

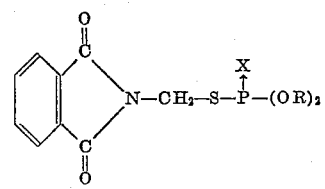

wherein X is a member chosen from the group consisting of sulfur and oxygen and R is a lower alkyl radical comprising reacting a member selected from the group consisting of N-bromomethyl phthalimide and N-chloromethyl phthalimide with a compound of the formula $$Y-S-\overset{X}{\underset{|}{P}}(OR)_2$$

and wherein X and R are as defined above and Y is a member selected from the group consisting of ammonium and alkali metal radicals.

8. The method of making S-phthalimidomethyl O,O-diisopropyl dithiophospate comprising reacting a member selected from the group consisting of N-bromomethyl phthalimide and N-chloromethyl phthalimide with potassium O,O-diisopropyl dithiophosphate under refluxing conditions.

9. The method of making S-phthalimidomethyl O,O-diethyl dithiophosphate comprising reacting N-chloromethyl phthalimide with potassium O,O-diethyl dithiophosphate under refluxing conditions.

10. The method of making S-phthalimidomethyl O,O-dimethyl dithiophosphate comprising reacting a member selected from the group consisting of N-bromomethyl phthalimide and N-chloromethyl phthalimide with sodium O,O-dimethyl dithiophosphate under refluxing conditions.

11. The method of making S-phthalimidomethyl O,O-diethyl monothiophosphate comprising reacting N-chloromethyl phthalimide with ammonium O,O-diethyl monothiophosphate under refluxing conditions.

12. The method of making S-phthalimidomethyl O,O-dimethyl monothiophosphate comprising reacting a member selected from the group consisting of N-bromomethyl phthalimide and N-chloromethyl phthalimide with ammonium O,O-dimethyl monothiophosphate under refluxing conditions.

References Cited in the file of this patent

UNITED STATES PATENTS

| | | |
|---|---|---|
| 2,233,001 | Dickey | Feb. 25, 1941 |
| 2,447,715 | Rose | Aug. 24, 1948 |
| 2,553,770 | Kittleson | May 22, 1951 |
| 2,640,006 | Ligett et al. | May 26, 1953 |
| 2,644,002 | Hoegberg | June 30, 1953 |
| 2,706,194 | Morris et al. | Apr. 12, 1955 |

FOREIGN PATENTS

| | | |
|---|---|---|
| 930,446 | Germany | July 18, 1955 |